US012123550B2

(12) United States Patent
Lee et al.

(10) Patent No.: US 12,123,550 B2
(45) Date of Patent: Oct. 22, 2024

(54) HIGH PRESSURE TANK HAVING HOOP LAYER AND HELICAL LAYER WOUND THEREON AND METHOD OF MANUFACTURING SAME

(71) Applicant: LOTTE CHEMICAL CORPORATION, Seoul (KR)

(72) Inventors: You Jung Lee, Daejeon (KR); Young Koan Ko, Daejeon (KR); Dae Gun Kim, Daejeon (KR); Won Young Kim, Daejeon (KR)

(73) Assignee: Lotte Chemical Corporation, Seoul (KR)

( * ) Notice: Subject to any disclaimer, the term of this patent is extended or adjusted under 35 U.S.C. 154(b) by 0 days.

(21) Appl. No.: 17/780,629

(22) PCT Filed: Nov. 18, 2020

(86) PCT No.: PCT/KR2020/016268
§ 371 (c)(1),
(2) Date: May 27, 2022

(87) PCT Pub. No.: WO2021/107486
PCT Pub. Date: Jun. 3, 2021

(65) Prior Publication Data
US 2023/0358361 A1    Nov. 9, 2023

(30) Foreign Application Priority Data

Nov. 27, 2019  (KR) ........................ 10-2019-0154076

(51) Int. Cl.
*F17C 1/06* (2006.01)
(52) U.S. Cl.
CPC ........ *F17C 1/06* (2013.01); *F17C 2201/0109* (2013.01); *F17C 2203/0604* (2013.01);
(Continued)

(58) Field of Classification Search
CPC ........ F17C 1/06; F17C 1/04; F17C 2223/036; F17C 2260/011; F17C 2260/01;
(Continued)

(56) References Cited

U.S. PATENT DOCUMENTS 5,284,996 A  *  2/1994  Vickers ................... B64G 1/22
                                                       405/129.55
6,953,129 B2 * 10/2005  DeLay ....................... F17C 1/06
                                                       220/562
(Continued)

FOREIGN PATENT DOCUMENTS

CN        101855488 A    10/2010
JP        2011-163354 A   8/2011
(Continued)

OTHER PUBLICATIONS

International Search Report in counterpart International Application No. PCT/KR2020/016268 dated Feb. 18, 2021, pp. 1-3.
(Continued)

*Primary Examiner* — Robert J Hicks
(74) *Attorney, Agent, or Firm* — Additon, Pendleton & Witherspoon, P.A.

(57)  ABSTRACT

Provided is a high-pressure tank wound with a hoop layer and a helical layer. According to the present invention, the high-pressure tank includes: a liner which includes a cylinder portion and two dome portions respectively formed at both ends of the cylinder portion; and a composite material layer which includes a hoop layer and a helical layer, wound on an outer circumferential surface of the liner, wherein the helical layer includes a twist portion wound on a junction portion of the cylinder portion and the dome portion, and the twist portion is twisted and wound while wrapping on an end portion of the hoop layer when the helical layer passes by the hoop layer and is then wound toward the dome portion.

5 Claims, 11 Drawing Sheets

(52) U.S. Cl.
CPC .............. *F17C 2203/0609* (2013.01); *F17C 2203/0621* (2013.01); *F17C 2203/067* (2013.01); *F17C 2209/2154* (2013.01); *F17C 2221/012* (2013.01); *F17C 2223/036* (2013.01); *F17C 2260/011* (2013.01); *F17C 2270/0168* (2013.01)

(58) Field of Classification Search
CPC ...... F17C 2201/0109; F17C 2209/2154; F17C 2203/067; F17C 2203/0663; F17C 2203/0604; F17C 2203/0609; F17C 2203/0621; F17C 2203/0619
USPC ............... 220/590, 589, 588, 586, 62.19; 242/475.7; 156/169, 168, 167, 166
See application file for complete search history.

(56) References Cited

U.S. PATENT DOCUMENTS

| | | | |
|---|---|---|---|
| 7,086,553 B2 * | 8/2006 | Debecker | F17C 1/06 220/589 |
| 7,641,949 B2 * | 1/2010 | DeLay | B29C 53/602 220/586 |
| 2011/0056960 A1 | 3/2011 | Blanc et al. | |
| 2012/0024746 A1 | 2/2012 | Otsubo | |
| 2017/0219165 A1 | 8/2017 | Takemoto | |
| 2018/0104916 A1 | 4/2018 | Nishiwaki et al. | |
| 2018/0272592 A1 | 9/2018 | Kobayashi | |
| 2019/0390821 A1 * | 12/2019 | Katano | F17C 1/06 |
| 2020/0049312 A1 * | 2/2020 | Sawai | F17C 1/02 |
| 2021/0088183 A1 | 3/2021 | Middendorf | |
| 2021/0324999 A1 * | 10/2021 | Bäumer | F17C 1/06 |

FOREIGN PATENT DOCUMENTS

| | | |
|---|---|---|
| JP | 2011-185360 A | 9/2011 |
| JP | 2015-157449 A | 9/2015 |
| JP | 6354846 B2 | 7/2018 |
| JP | 2018-155302 A | 10/2018 |
| KR | 10-1802631 B1 | 11/2017 |
| KR | 10-2018-0108485 A | 10/2018 |
| KR | 10-2018-0119956 A | 11/2018 |
| WO | 2017/073108 A1 | 5/2017 |
| WO | 2019-020597 A1 | 1/2019 |
| WO | 2021/107486 A1 | 6/2021 |

OTHER PUBLICATIONS

Extended Search Report in counterpart European Application No. 20891815.1 dated Nov. 8, 2023, pp. 1-8.
Office Action in counterpart Japanese Application No. 2022-530920 dated Apr. 5, 2024, pp. 1-3.

* cited by examiner

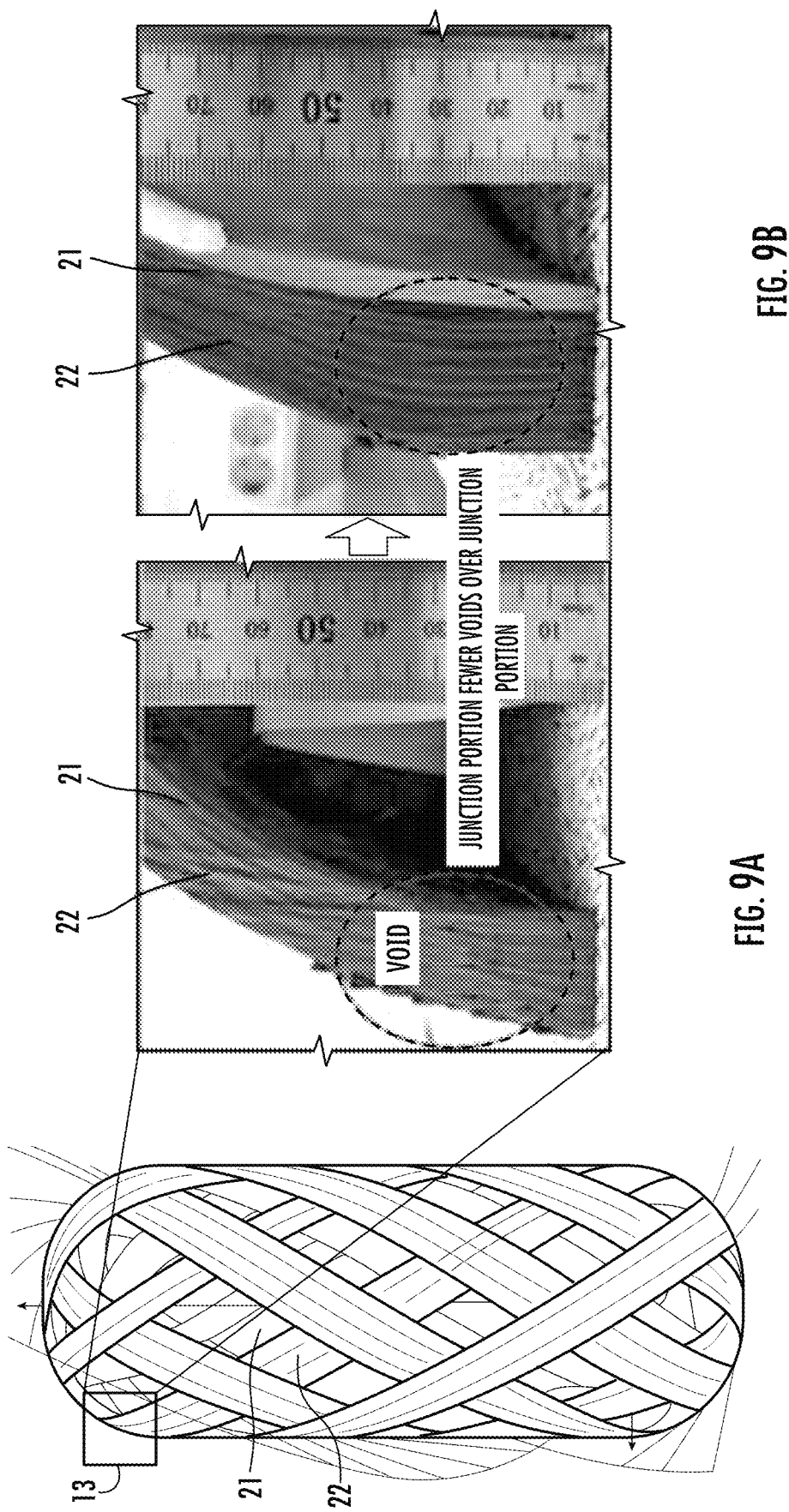

HIGH PRESSURE TANK HAVING HOOP LAYER AND HELICAL LAYER WOUND THEREON AND METHOD OF MANUFACTURING SAME

CROSS-REFERENCE TO RELATED APPLICATIONS

This application claims priority to and the benefit of International Application No. PCT/KR2020/016268, filed Nov. 18, 2020, which published as WO 2021/107486 on Jun. 3, 2021, and Korean Patent Application No. 10-2019-0154076, filed in the Korean Intellectual Property Office on Nov. 27, 2019, the entire disclosure of each of which is incorporated herein by reference.

TECHNICAL FIELD

The present invention relates to a high-pressure tank wound with a hoop layer and a helical layer and a manufacturing method thereof, and more particularly, to a high-pressure tank wound with a hoop layer and a helical layer, preventing a void which may occur over a junction portion of a cylinder portion and a dome portion due to an end portion of the hoop layer when the hoop layer and the helical layer are formed by winding fibers on a surface of a liner by using a filament winding method, and a manufacturing method thereof.

BACKGROUND ART

Among commonly used fuel supply systems, a hydrogen tank positioned in a hydrogen supply system may store high-pressure compressed hydrogen of about 700 bars. The stored compressed hydrogen may be released to a high-pressure line depending on whether a high-pressure regulator mounted at an inlet of the hydrogen tank is turned on/off, and then be decompressed while passing through a start valve and a hydrogen supply valve to be supplied to a fuel cell stack.

Here, high-pressure gas may be used as fuel (e.g., hydrogen), and accordingly, required is a gas storage tank in order to store and discharge gas as needed. In particular, gas has a low storage density in the tank, it may be efficient to store gas at high pressure, and sealability of the tank may be very important to store gas at the high pressure. In particular, an alternative fuel gas vehicle may have a limited space in which the storage tank is mounted, and thus be required to maintain stability while maintaining a storage pressure at the high pressure.

A composite tank among these fuel gas storage tanks may be required to have an outer cover reinforced by using a fiber-reinforced composite material having high specific strength and high specific stiffness to withstand a high internal pressure of hydrogen gas, and may have a liner inserted therein for maintaining airtightness of gas. In detail, a manufacturing method of a pressure tank, based on a filament winding method, may include a process of forming a liner forming a frame of the tank and a process of winding continuous fibers on the outside of the liner.

In general, the filament winding method can be classified into a wet winding method and a towpreg winding method. The wet winding method may be a process including an impregnation process during a filament winding, thereby winding the fibers while impregnating the fibers in resin. The towpreg winding method may also be referred to as a dry winding method, and may be a process of winding a material which uses the fibers already impregnated in the resin. Unlike the towpreg winding method, when using the wet winding method, slip may easily occur at a dome portion having a curved surface, and it may thus be difficult to perform helical winding at the dome portion which has medium to high angles. In addition, a bandwidth of the fiber may be spread, and a pattern of the fibers wound on the dome portion may not be formed as designed.

Here, referring to FIG. 1, a liner 1 may include a cylinder portion 2 having a cylindrical shape and a dome portion 3 having a dome shape positioned at each of two end portions of the cylinder portion. The cylinder portion 2 and the dome portion 3 may have different shapes from each other, and may thus be required to use different methods of winding the fibers when winding a composite layer 4 made of continuous fibers on the outside of the liner. Referring to FIG. 2A, a hoop layer 5 may be formed by winding the continuous fibers on the cylinder portion 2 in a direction perpendicular to a central axis, which may serve to withstand stress acting in the liner in a circumferential direction due to an internal pressure of gas generated when gas is injected into the high-pressure tank. Referring to FIG. 2B, a helical layer 6 may be formed by winding the continuous fibers on the dome portion 3 in a direction having a specific angle based on the central axis, which may serve to withstand the stress mainly acting in the liner in an axis direction due to the internal pressure of the gas.

Meanwhile, a pattern design of the fibers to be wound on the hydrogen tank is aimed to be made for the tank to reach a desired design burst pressure. In general, for its safety during burst when the tank reaches the burst pressure, the burst may be induced to occur in a body region 8 of the cylinder portion 2 earlier than in the dome portion 3 or in a junction portion 7 of the cylinder portion and the dome portion. However, as shown in FIG. 3, when a defect such as a void 8 occurs due to a step occurring on the junction portion 7 of FIG. 1, the stress may not act based on a stress distribution induced by the design, and an error may thus occur between the design and its analysis.

As prior arts for improving the strength of the junction portion 7, disclosed are Japanese Patent Laid-Open Publication No. 2011-163354 (hereinafter, Patent Document 1), and Japanese Patent No. 6354846 (hereinafter, Patent Document 2).

Patent Document 1 discloses that a depression portion of a liner is formed in a tank in an axis direction in order to secure strength of a knuckle portion positioned on a junction portion, the tank is reinforced by using a material having a higher strength than resin of the liner, and winding is then performed. However, this case may further need a process of forming the depression portion inside the liner, and may reduce a volume inside the liner.

Patent Document 2 discloses that a high-angle helical layer is first wound up to a portion extended from a cylinder portion, and a hoop layer is then wound thereon in order to improve strength. However, this case may unnecessarily increase a weight of a composite material by additionally winding the extended helical layer for winding the hoop layer.

DISCLOSURE

Technical Problem

An exemplary embodiment of the present invention provides a high-pressure tank wound with a hoop layer and a helical layer, preventing a void which may occur over a junction portion of a cylinder portion and a dome portion due to an end portion of the hoop layer when a composite material layer is formed by winding fibers on a surface of a liner by using a filament winding method, and a manufacturing method thereof.

Technical Solution

According to an exemplary embodiment of the present invention, a high-pressure tank includes: a liner which includes a cylinder portion and two dome portions respectively formed at both ends of the cylinder portion; and a composite material layer which includes a hoop layer and a helical layer, wound on an outer circumferential surface of the liner, wherein the helical layer includes a twist portion wound on a junction portion of the cylinder portion and the dome portion, and the twist portion is twisted and wound while wrapping on an end portion of the hoop layer when the helical layer passes by the hoop layer and is then wound toward the dome portion.

The helical layer may include a main wound portion wound on the cylinder portion, and an angle θ of the main wound portion is defined by Equation 1 below:

$$\theta = \tan^{-1}\left(\frac{\pi D}{2A}\right) \quad \text{[Equation 1]}$$

D: diameter of cylinder portion
A: Length of cylinder portion in length direction The cylinder portion may have the diameter including a thickness of the hoop layer in a state where the hoop layer is wound on the outer circumferential surface of the cylinder portion.

Each of the hoop layer and the helical layer may be formed of towpreg.

According to another exemplary embodiment of the present invention, a manufacturing method of a high-pressure tank including a liner which includes a cylinder portion and two dome portions respectively formed at both ends of the cylinder portion, and a composite material layer wound on an outer circumferential surface of the liner, includes: winding a hoop layer of winding a continuous composite material on an outer circumferential surface of the cylinder portion; and winding a helical layer of winding the continuous composite material on the hoop layer and an outer circumferential surface of the dome portion, wherein the winding of the helical layer includes winding a twist portion of winding the continuous composite material on a junction portion of the cylinder portion and the dome portion, and in the winding the twist portion, the continuous composite material is twisted and wound while the continuous composite material presses an end of the hoop layer when the continuous composite material passes by the hoop layer and then is wound toward the dome portion.

Advantageous Effects

As set forth above, according to the present invention, it is possible to prevent the void caused by the end portion of the hoop layer by the continuous composite material fibers forming the helical layer to be wound while strongly pressing the step occurring over the junction portion of the cylinder portion and the dome portion due to the end portion of the hoop layer when the continuous composite material fibers are wound to form the helical layer.

In addition, according to the present invention, it is possible to effectively prevent the void while using the existing materials as they are without having any separate component supporting the junction portion, or without stacking the helical layer several times to have a great thickness, as in the prior high-pressure tank.

DESCRIPTION OF THE DRAWINGS

FIGS. 9A and 9B are views comparing whether the void occurs over a junction portion of cylinder and dome portions when a prior filament winding method and the filament winding method according to the present invention are respectively applied.

MODE FOR INVENTION

Figure 1:
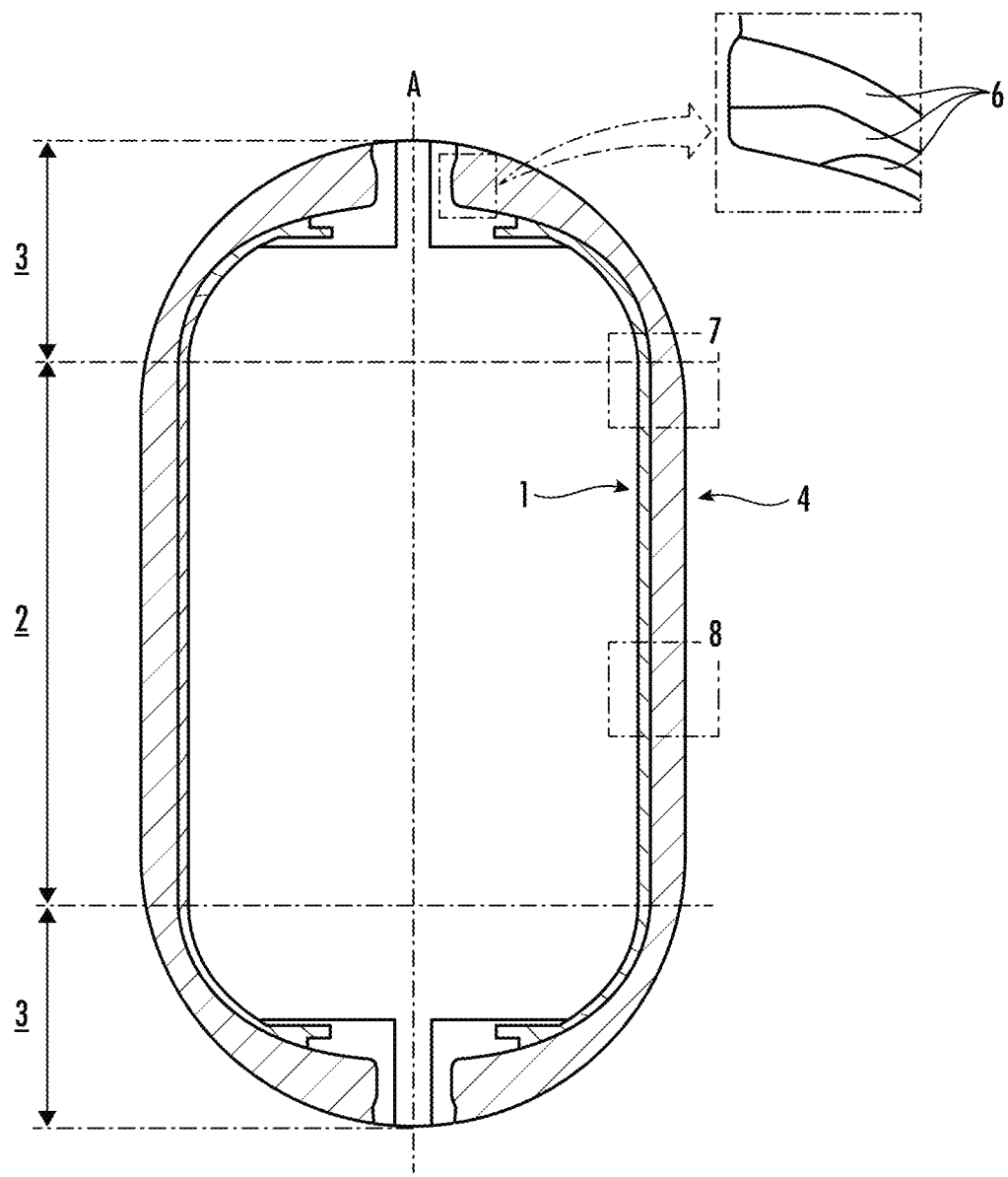
FIG. 1 is a cross-sectional view showing a prior high-pressure tank wound with a hoop layer and a helical layer.
Figure 2A:
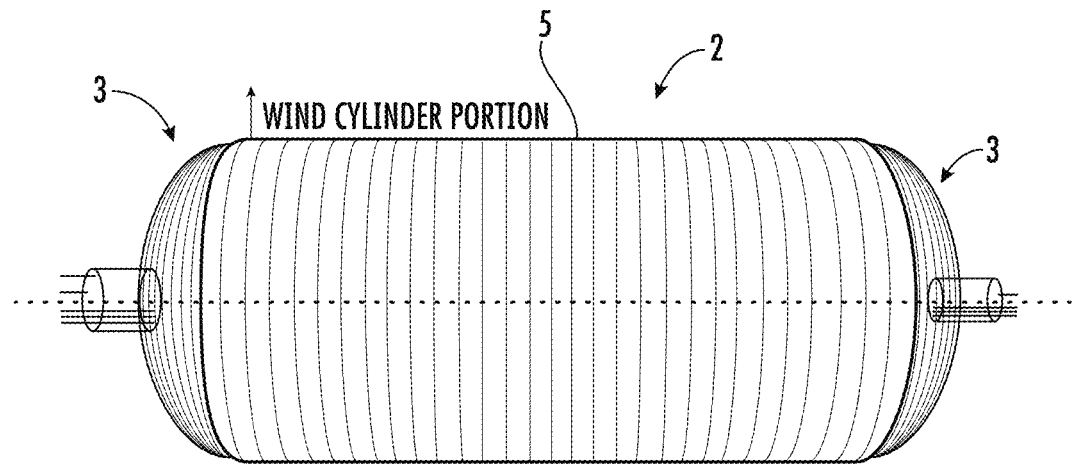
FIGS. 2A and 2B are views respectively showing that the hoop layer and helical layer of a composite material layer are wound, in the high-pressure tank wound with the hoop layer and the helical layer.
Figure 2B:
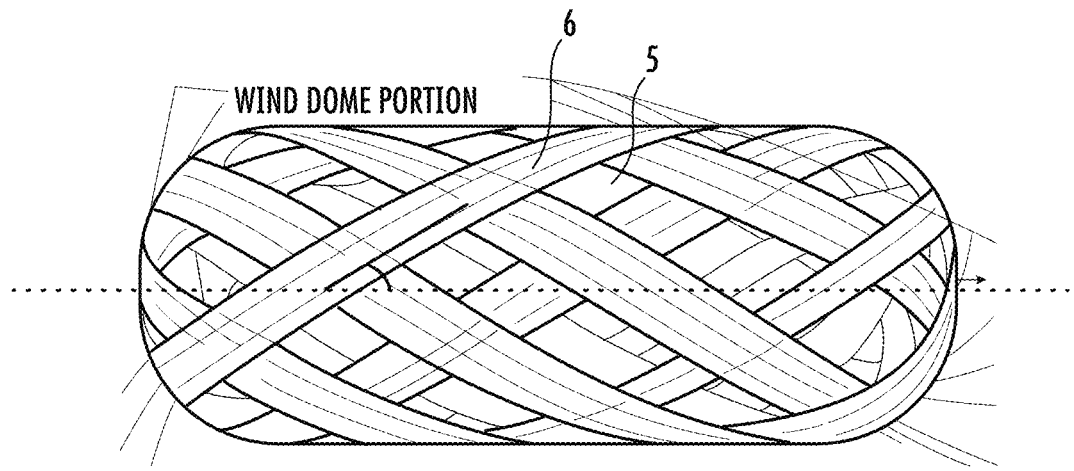
Figure 3:
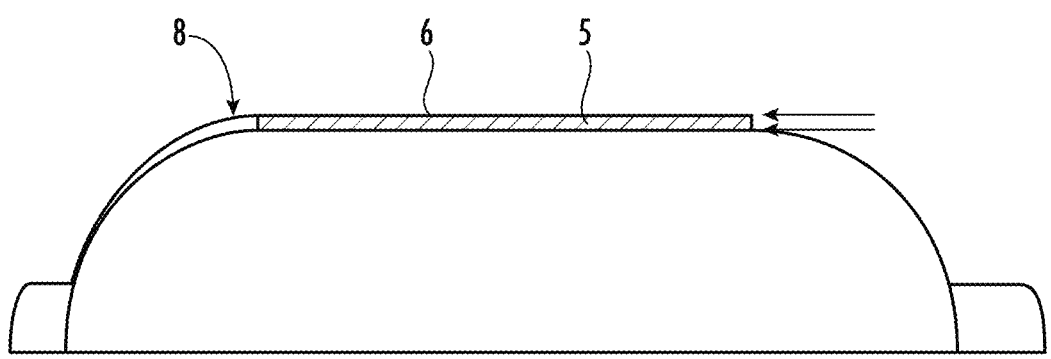
FIG. 3 is a view showing a void caused by a step occurring in the prior high-pressure tank wound with the hoop layer and the helical layer.

Hereinafter, the present invention will be fully described with reference to the accompanying drawings. However, the present invention may be implemented in various different forms and is not limited to exemplary embodiments described herein. Furthermore, it should be understood that the accompanying drawings are provided only in order to allow the exemplary embodiments of the present invention to be easily understood, and the scope of the present invention is not limited by the accompanying drawings, and includes all the modifications, equivalents, and substitutions included in the scope of the present invention. In addition, in the drawings, portions unrelated to the description are omitted to clearly describe the present invention, the size, type and shape of each component shown in the drawings may be variously modified and same/similar portions are denoted by same/similar reference numerals throughout the specification.

Throughout the present specification, in case that any one part is referred to as being "connected (contacted, combined or coupled) to" another part, it means that any one part and another part are "directly connected (contacted, combined or coupled) to" each other or are "indirectly connected (contacted, combined or coupled) to" each other with another member interposed therebetween. In addition, unless explicitly described to the contrary, "including (comprising or having)" any component will be understood to imply "including (comprising or having)" other components rather than excluding any other components.

Terms used in the present specification are used only to describe specific exemplary embodiments rather than limiting the present invention. Singular forms used herein are intended to include plural forms unless explicitly indicated otherwise, and components implemented in a distributed form may also be implemented in a combined form unless there is a special limitation. It should be further understood that terms "include" or "have" used in the present specification specify the presence of features, numerals, steps, operations, components, parts mentioned in the present specification or combinations thereof, and do not preclude the presence or addition of one or more other features, numerals, steps, operations, components, parts or combinations thereof.

Terms including an ordinal number such as first or second, used in the present specification may be used to describe various components. However, these components are not limited to these terms. The terms are used only to distinguish one component from another component. For example, a 'first' component may be named a 'second' component and the 'second' component may also be similarly named the 'first' component, without departing from the scope of the present invention.

Figure 4A:
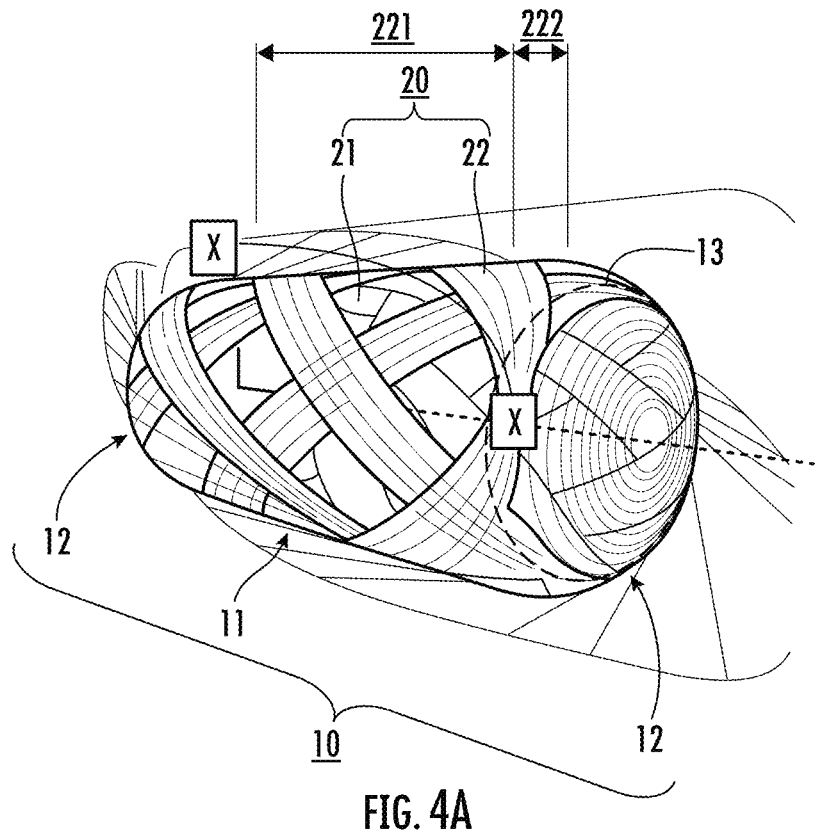
FIGS. 4A and 4B are views each showing that the helical layer is wound by using a filament winding method according to the present invention.
Figure 4B:
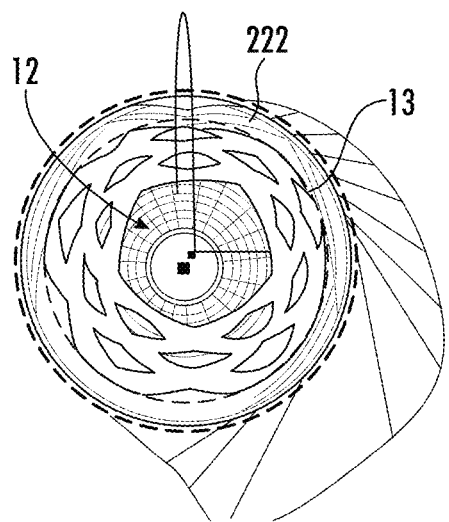
Figure 5:
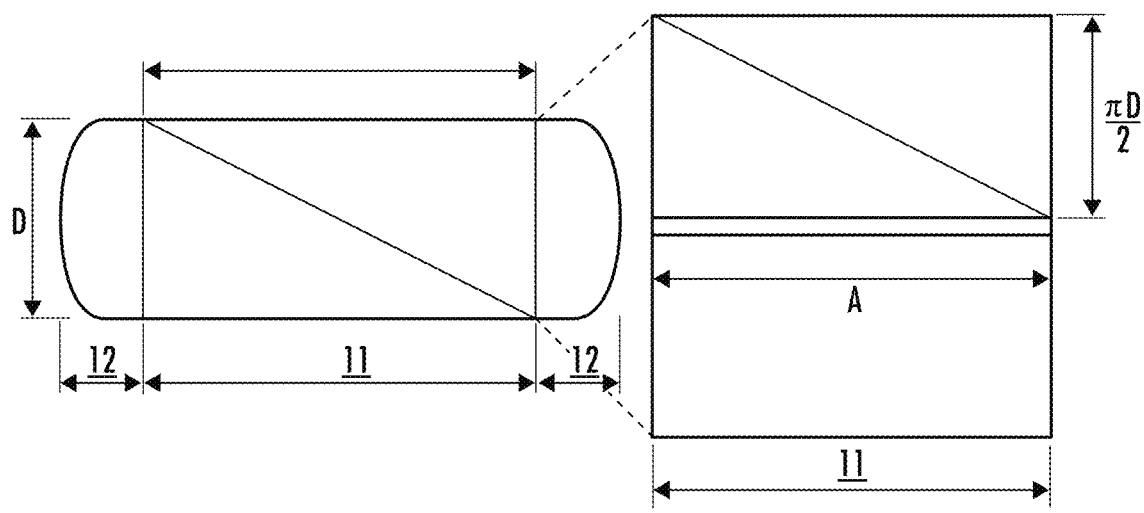
FIG. 5 is a development view of a cylinder portion for calculating an angle at which the helical layer is wound according to the present invention.

FIGS. 4A and 4B are views each showing that the helical layer is wound by using a filament winding method according to the present invention. In addition, FIG. 5 is a development view of a cylinder portion for calculating an angle at which the helical layer is wound according to the present invention.

Referring to FIGS. 4A and 4B, a high-pressure tank wound with the hoop layer and the helical layer according to the present invention may include a liner 10 and a composite material layer 20 reinforcing an outer circumferential surface of the liner 10.

In detail, the composite material layer 20 wound on the outer surface of the liner 10 can be formed by winding continuous composite material fibers having a predetermined width. Here, the continuous fibers forming the composite material layer 20 can be prepared in advance before performing the winding, and can be wound on the outer circumferential surface of the liner 10 at an angle determined by a winding device. In detail, the winding device (not shown) may be moved to form the predetermined angle with respect to the liner 10 in a state where the pre-injected liner 10 is fixed, and the continuous composite material fibers having the predetermined width can be wound on an outer circumferential surface of the liner 10 while having a predetermined tension to form the composite material layer 20.

The liner 10 may include a cylinder portion 11 formed on the high-pressure tank in a central axis direction, and two dome portions 12 respectively formed at both ends of the cylinder portion 11. The cylinder portion 11 and the two dome portions 12 may have approximately the same diameter as each other.

The cylinder portion 11 may have a cylindrical shape and form a liner 10 and a body of the high-pressure tank including the liner 10 as its component, and the dome portion 12 may have a hemispherical shape and positioned at each of two end portions of the cylinder portion 11.

Referring to the developed view of the cylinder portion 11 as shown in FIG. 5, the cylinder portion 11 may have a straight line with no curvature and formed on the high-pressure tank in the axis direction, based on the developed view of the cylinder portion 11. However, the cylinder portion 11 may have a curvature formed on the high-pressure tank in a circumferential direction, based on a three-dimensional shape of the cylinder portion 11. On the other hand, the dome portion 12 of the high-pressure tank may be a surface of the high-pressure tank, having a curvature in each of the axis direction and the circumferential direction.

Referring back to FIGS. 4A and 4B, the composite material layer 20 may include a hoop layer 21 and a helical layer 22. Here, the hoop layer 21 can be formed by winding the continuous composite material fibers on the outer circumferential surface of the cylinder portion 11 in a direction substantially perpendicular to a central axis. The hoop layer 21 may serve to withstand stress of high pressure, acting in the circumferential direction. The helical layer 22 may be formed by continuously winding the continuous composite material fibers on the outer circumferential surfaces of the hoop layer 21 and dome portions 12 to be inclined with the central axis. The helical layer 22 may serve to mainly withstand the stress acting in the high-pressure tank in the axis direction. That is, the hoop layer 21 may be wound on the cylinder portion 11 of the high-pressure tank, and may not be wound on the dome portion 12 of the high-pressure tank. On the other hand, the helical layer 22 may be wound on the hoop layer 21 wound on the cylinder portion 11 of the high-pressure tank and the dome portions 12 of the high-pressure tank.

In addition, referring to FIGS. 4A and 4B, the helical layer 22 may include a main wound portion 221 and a twist portion 222.

The main wound portion 221 may be formed on a body region of the cylinder portion 11, and wound at a predetermined angle determined by a diameter of the cylinder portion 11 and a length of the cylinder portion 11 in the central axis direction. In addition, the twist portion 222 can be formed on a junction portion 13 of the cylinder portion 11 and the dome portion 12, and wound at an angle different from that of the main wound portion 221.

Here, the main wound portion 221 and the twist portion 222 may be a portion of the helical layer 22. The main wound portion 221 partially cross from the helical layer 22 to the cylinder portion 11 at the predetermined angle. The twist portion 222 may be wound at an angle changed to be different from the angle at which the main wound portion 221 is wound. Here, the twist portion 222 may be twisted and wound on the junction portion 13 of the cylinder portion 11 and the dome portion 12 while wrapping the junction portion 13. An end portion of the hoop layer 21 may be positioned on the junction portion 13, the twist portion 222 can be wound while pressing the end portion of the hoop layer 21.

In addition, the present invention uses a method in which the continuous composite material fibers having the predetermined width are wound by using a winding device. The main wound portion 221 and twist portion 222 may thus repeatedly appear when the continuous composite material fibers are wound on the liner 10 to form the helical layer.

Meanwhile, in the present specification, the junction portion 13 of the cylinder portion 11 and the dome portion 12 may include not only a junction point on which the cylinder portion 11 and the dome portion 12 are joined to each other but also a surrounding area of the junction point in a certain range, formed between the hoop layer 21 and the helical layer 22, in which a void may occur due to a step caused by the end portion of the hoop layer 21.

Here, referring to FIG. 5, a predetermined angle θ at which the main wound portion 221 is wound may be appropriately set based on a predetermined diameter D of the cylinder portion 11 and a length A of the cylinder portion 11 in a length direction. For example, the angle θ can be defined based on Equation 1 as below.

$$\theta = \tan^{-1}\left(\frac{\pi D}{2A}\right) \quad \text{[Equation 1]}$$

D: Diameter of cylinder portion

A: Length of cylinder portion in length direction

For example, a general high-pressure tank may have the cylinder portion 11 having a length of about 580 mm and a diameter of about 322 mm. In this case, an angle of approximately 40 degrees may be an angle of the main wound portion 221 wound on the most area of the body region of the cylinder portion 11. Here, the main wound portion 221 except for the twist portion 222 can generally maintain the predetermined angle.

Here, the main wound portion 221 of the helical layer 22 may be wound on the hoop layer 21 wound on the body region of the cylinder portion 11. It is thus necessary to consider that a winding diameter of the main wound portion 221 is to be increased as the hoop layer 21 is wound thereon. To this end, it is preferable to calculate the angle θ of the main wound portion 221 considering that the cylinder portion 11 has a diameter including a thickness of the hoop layer 21 in a state where the hoop layer 21 is wound on the outer circumferential surface of the cylinder portion 11.

Figure 6:
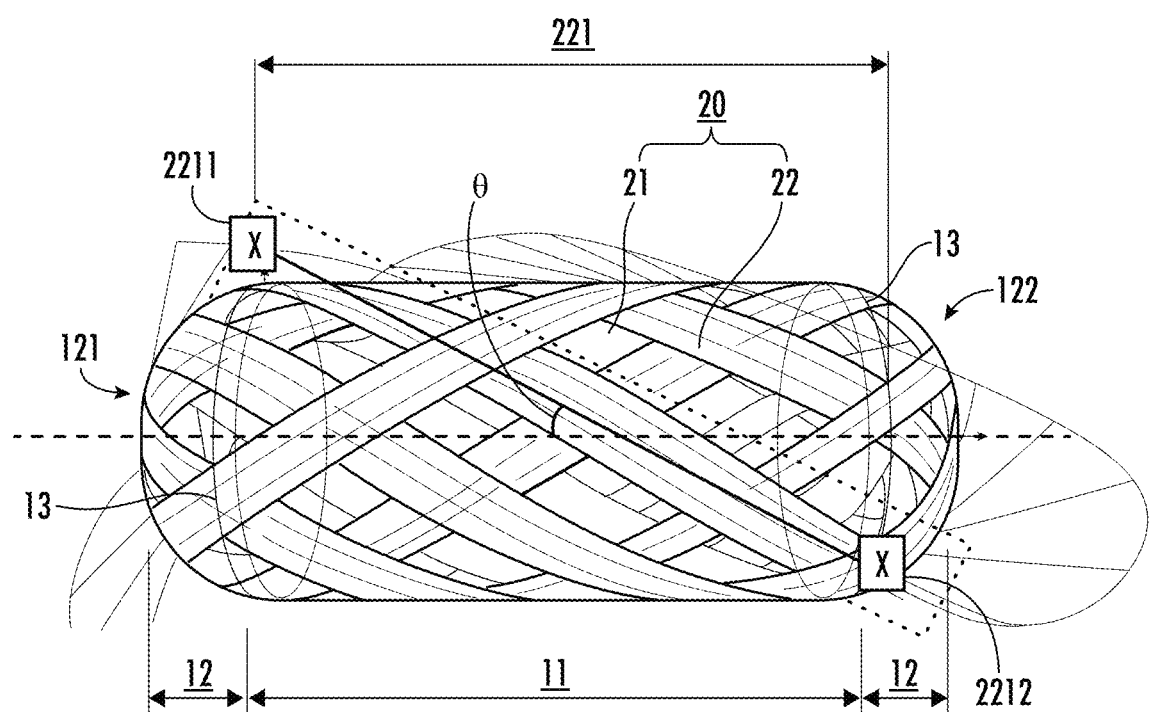
FIGS. 6 to 7B are views each showing a high-pressure tank on which the fibers are wound on all of the cylinder portion and a dome portion, without any twist portion, at the same angle as a main wound portion when the helical layer is formed by winding the fibers on a surface of the liner by using the filament winding method.
Figure 7A:
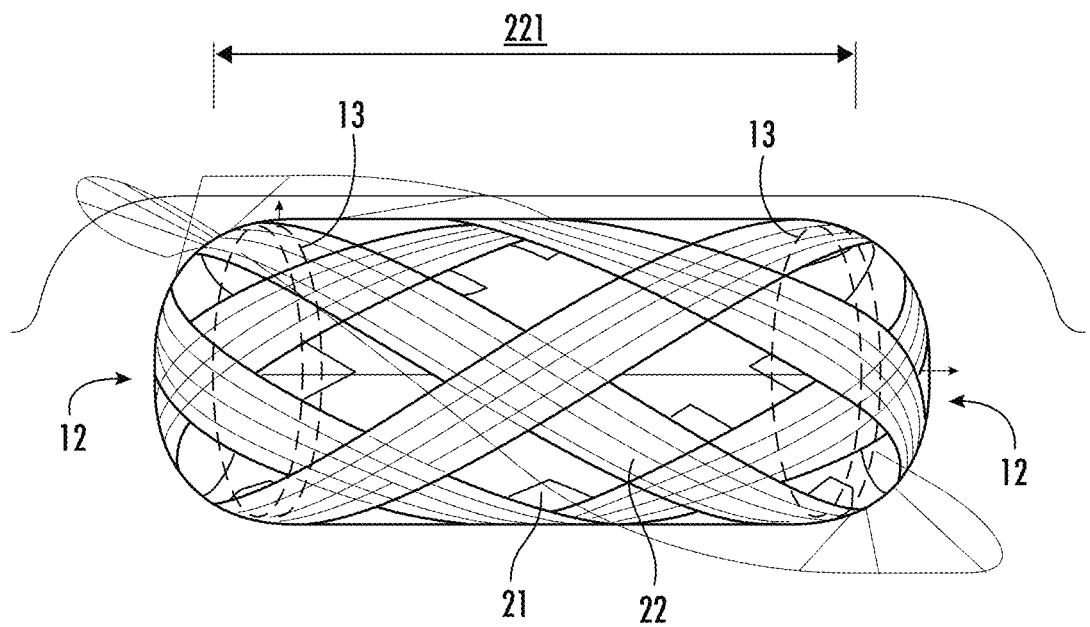
Figure 7B:
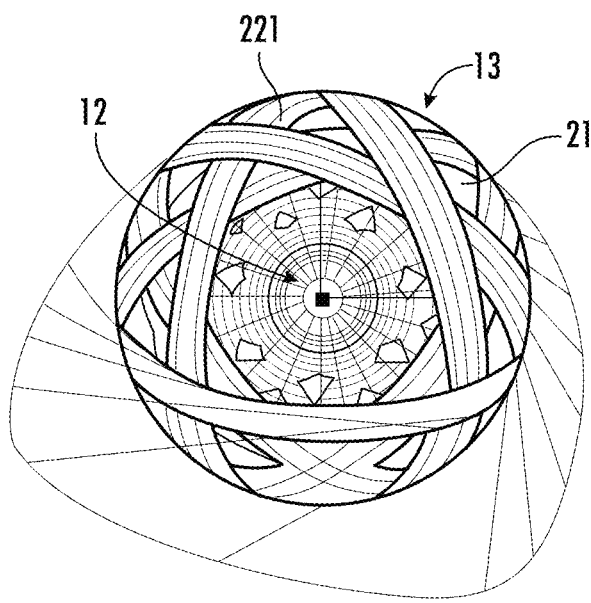

FIGS. 6 to 7B are views each showing a high-pressure tank on which the fibers are wound on all of the cylinder portion and the dome portion, without any twist portion, at the same angle as the main wound portion when the helical layer is formed by winding the fibers on a surface of the liner by using the filament winding method.

Referring to FIG. 6, the main wound portion 221 may be wound at the angle determined by the diameter of the cylinder portion 11 and the length of the cylinder portion 11 in the central axis direction, that is, the predetermined angle θ of the main wound portion 221 as defined above for example. Here, the main wound portion 221 may be wound at an angle crossing a first end 2211 and a second end 2212 each positioned on the junction portion of the cylinder portion and the dome portion. Here, the first end 2211 and the second end 2212 of the main wound portion 221 may each be a portion of the helical layer 22, corresponding to each of two ends of a straight line diagonally crossing the central axis and a radius of the cylinder portion, based on the developed view of the cylinder portion shown in FIG. 5.

However, as shown in FIG. 7, when the main wound portion 221 of the helical layer 22 is wound at the predetermined angle θ obtained based on the development view shown in FIG. 5, the helical layer 22 may be diagonally wound across the cylinder portion 11 from the first end 2211, and its end portion may then pass by the second end 2212 of the main wound portion 221, may be wound over the junction portion 13 of the second dome portion 122 and may then reach the dome portion 12. That is, when the main wound portion 221 is wound at the predetermined angle θ, unlike the cylinder portion 11, the dome portion 12 may have the approximately hemispherical shape, and thus be affected by a curvature caused by the hemispherical shape. Accordingly, both the end portions of the helical layer 22, reaching the two dome portions 12 (a first dome portion 121 and a second dome portion 122) respectively formed at the two end portions of the cylinder portion 11 may be wound close to the protruding ends of the dome portion 12 beyond the junction portion 13.

As shown in FIGS. 6 to 7B, a pressure of the helical layer 22, which may be applied to the junction portion 13, may be limited when the helical layer 22 is wound at the same angle as the predetermined angle of the main wound portion 221 without the twist portion 222. Such a configuration may make it difficult for the helical layer 22 to sufficiently press the step-type step which may be caused by the end portion of the hoop layer 21. It may thus be difficult to completely prevent the void which may occur over the junction portion 13 of the cylinder portion 11 and the dome portion 12 due to the end portion of the hoop layer 21.

For this reason, the present invention uses not only the main wound portion 221 which is wound on the body region of the cylinder portion at the predetermined angle, but also the twist portion 222 which is wound on the junction portion 13 of the cylinder portion 11 and the dome portion 12 at the angle changed to be different from the angle at which the main wound portion 221 are wound.

Figure 8A:
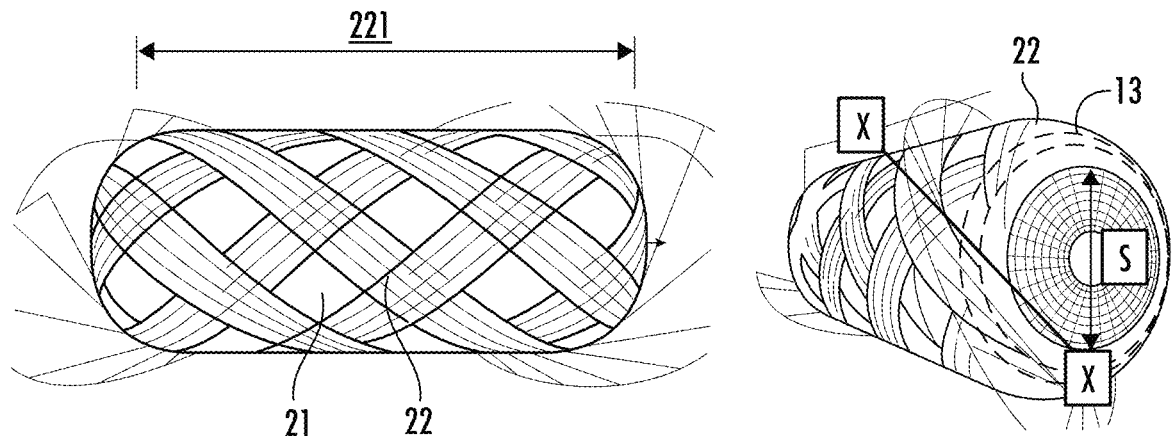
FIGS. 8A and 8B are views comparing the high-pressure tanks wound with the hoop layer and the helical layer to each other, each including or not including the twist portion of the present invention.
Figure 8B:
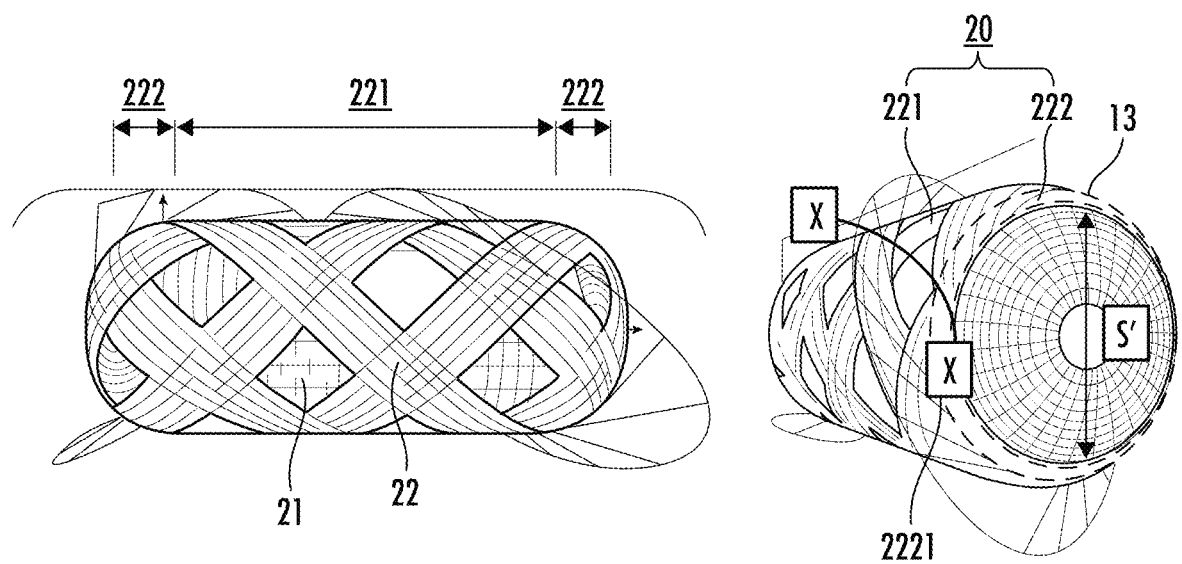

FIGS. 8A and 8B are views comparing the high-pressure tanks wound with the hoop layer and the helical layer to each other, each including or not including the twist portion 222 of the present invention. FIG. 8A shows a configuration without the twist portion 222 of the present invention, FIG. 8B shows a configuration with the twist portion 222 of the present invention.

Referring to FIG. 8B, another angle at which the twist portion 222 is wound may be, for example, an angle larger than the angle θ of the main wound portion 221, calculated based on the development view of the cylinder portion, as shown in FIG. 8A. However, based on a side of the development view of FIG. 5, another angle at which the twist portion 222 is wound, may not be a fixed angle, and may be an angle changed while being wound.

The intermediate angle of approximately 40 degrees can be the predetermined angle θ of the main wound portion 221 of the helical layer 22 in FIG. 8A when the cylinder portion 11 has the length of about 580 mm and the diameter of about 322 mm. Here, the helical layer 22 may be diagonally wound across the cylinder portion 11 from the first end 2211, and its end portion may then pass by the second end 2212 of the main wound portion 221, may be wound over the junction portion 13 of the second dome portion 122 and may then reach the dome portion 12. Here, an approximate circle can be derived when connecting the end portions of the plurality of helical layers 22, each wound toward the dome portion 12, and may have a diameter S of about 207 mm.

On the other hand, as shown in FIG. 8B, the helical layer 22 according to the present invention may surround a circumference of the junction portion 13 because the twist portion 222 is twisted on and wound up to a portion of the dome portion 12, on which the hoop layer 21 is not wound, and the main wound portion 221 is wound on the hoop layer 21 of the cylinder portion 11 at the predetermined angle θ. Here, an approximate circle can be derived when connecting portions of the twist portion 222, surrounding the junction portion 13, and may have a diameter S' of about 270 mm.

Meanwhile, the hoop layer 21 may have a predetermined thickness. Accordingly, when the hoop layer 21 is wound on the cylinder portion 11, the step-type step may occur between the hoop layer 21 and the helical layer 22 wound on a certain area of the dome portion 12, on which the hoop layer 21 is not wound, beyond the cylinder portion 11. The void can occur between the helical layer 22 and the hoop layer 21 due to such a step-type step.

In order to solve this problem, the present invention shows that the twist portion 222 is twisted and wound while pressing the end of the hoop layer 21 when the helical layer 22 passes by the hoop layer 21 and then is wound on the dome portion 12. Accordingly, the twist portion 222 can effectively press the end portion of the hoop layer 21 while wrapping the junction portion 13 of the cylinder portion 11 and the dome portion 12, thereby preventing the void caused by the end portion of the hoop layer.

Referring to FIG. 8B, the twist portion 222 may include a twist switch portion 2221 having a winding direction switched based on the central axis of the high-pressure tank in a range in which the helical layer 22 entirely maintains its contact with the dome portion 12 when the helical layer 22 is wound on the dome portion 12. The twist switch portion 2221 may be formed in a process in which the twist portion 222 is twisted and wound while pressing the end of the hoop layer 21 as described above. However, the twist switch portion 2221 may be a portion where a winding direction of the helical layer 22 is switched to the other direction opposite to the one direction rather than a portion continuously wound along the central axis of the high-pressure tank in one direction to the end of the dome portion 12.

Here, twist switch portion 2221 may be positioned on the junction portion 13 of the cylinder portion 11 and the dome portion 12. Most of the tension of the helical layer 22 can be concentrated on the twist switch portion 2221 in a process of being twisted and wound, and the concentrated tension may allow the twist switch portion to withstand the stress caused by the internal pressure of the tank acting on the junction portion 13. It is thus possible to prevent the tank from busting due to the junction portion 13 which becomes a weak point.

In addition, referring to FIG. 8B, the helical layer 22 may be continuously wound on the hoop layer 21 and the outer circumferential surface of the dome portion 12 by using the winding device, and may thus be wound for a plurality of twist switch portions 2221 to appear by the continuous winding. Here, the helical layer 22 may be wound while the plurality of twist switch portions 2221 surround the junction portion 13. Accordingly, the plurality of twist switch portion 2221 may wrap as many areas of the junction portion 13 as possible while entirely pressing the end portion of the hoop layer 21, thereby preventing the void caused by the end portion of the hoop layer 21.

In addition, here, the helical layer 22 can be formed of a towpreg having tackiness. It is thus possible to minimize sliding or distortion occurring between the twist portion 222 and the dome portion 12 even when the helical layer 22 is twisted and wound on the curved dome portion 12.

FIGS. 9A and 9B are views comparing whether the void occurs over the junction portion of the cylinder portion and dome portion when a prior filament winding method and the filament winding method according to the present invention are respectively applied. FIG. 9A is a view showing that the void occurs when using the prior filament winding method, and FIG. 9B is a view showing that the void is prevented when using the filament winding method according to the present invention.

That is, the void may be prevented when using the filament winding method of the present invention because the helical layer 22 may more strongly press the step-type step which may occur on the junction portion 13 of the hoop layer 21 and the helical layer 22. In addition, according to the present invention, it is possible to effectively prevent a void 30 while using existing materials as they are without having any separate component supporting the junction portion 13, or without stacking the helical layer 22 several times to have a great thickness, as in the prior art.

Figure 10:
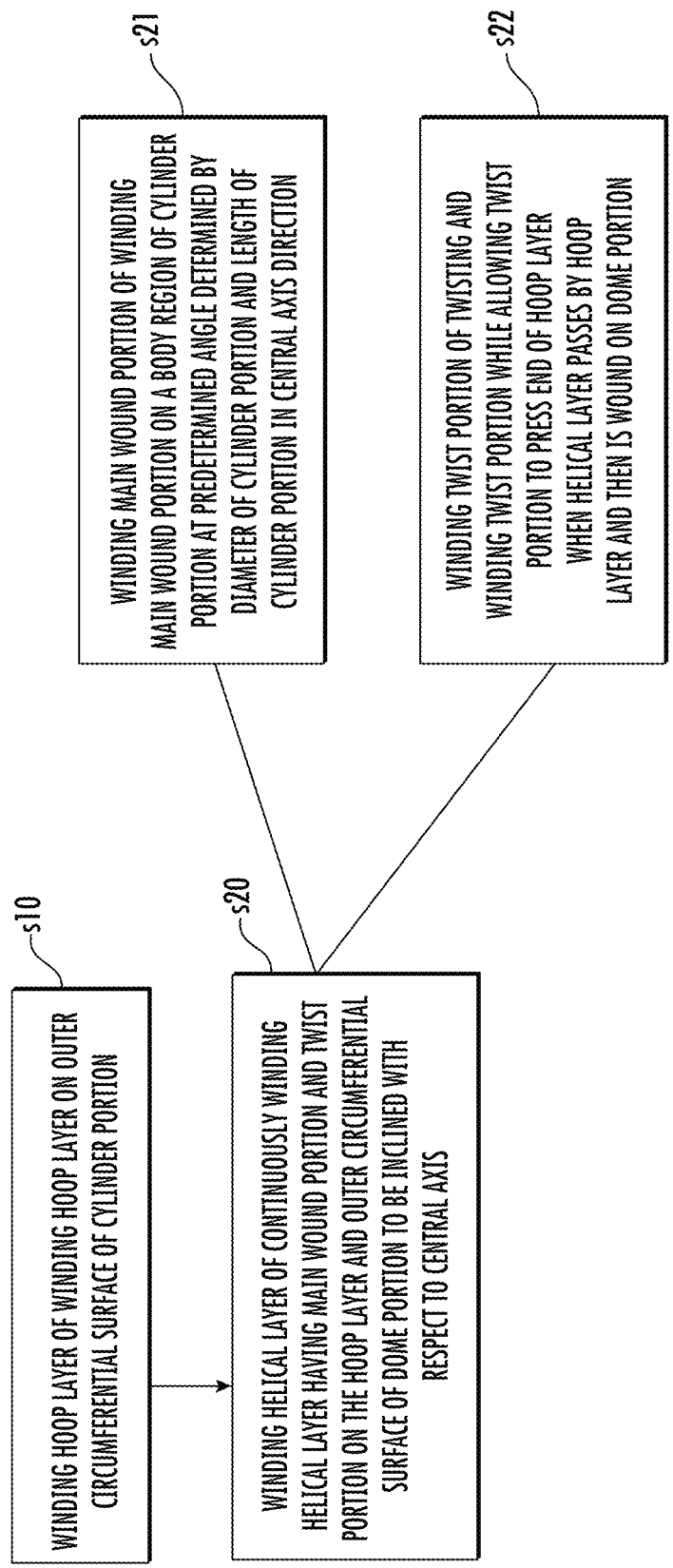
FIGS. 10 and 11 are flowcharts each schematically showing a method manufacturing of a high-pressure tank wound with a hoop layer and a helical layer according to the present invention.
Figure 11:
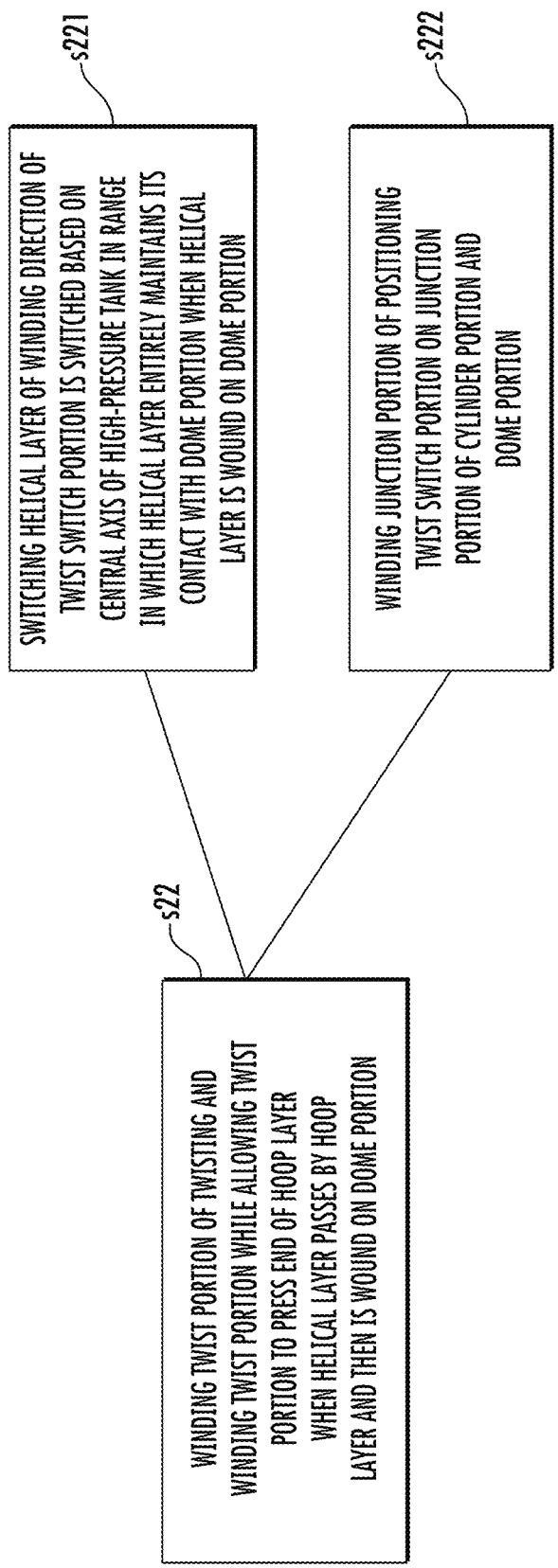

FIGS. 10 and 11 are flowcharts each schematically showing a manufacturing method of a high-pressure tank wound with a hoop layer and a helical layer according to the present invention.

The description briefly describes the manufacturing method of a high-pressure tank wound with a hoop layer and a helical layer, configured as described above, with reference to FIGS. 10 and 11. Omitted is a description of each component of the high-pressure tank to which the above-described filament winding method is applied for convenience. However, the same component can be applied to the manufacturing method of the high-pressure tank as it is.

Referring to FIG. 10, the manufacturing method of a high-pressure tank wound with a hoop layer and a helical layer may include winding the hoop layer (S10), winding the helical layer (S20), winding a main wound portion (S21), and winding a twist portion (S22).

The winding of the hoop layer (S10) may include winding the hoop layer 21 on an outer circumferential surface of a cylinder portion 11 in a direction perpendicular to a central axis of the tank. Next, the winding of the helical layer (S20) may include continuously winding the helical layer 22 having the main wound portion 221 and the twist portion 222 on the hoop layer 21 and an outer circumferential surface of the dome portion 12 to be inclined with respect to the central axis.

Here, the winding of the helical layer (S20) may include the winding of the main wound portion (S21) and the winding of the twist portion (S22).

The winding of the main wound portion (S21) may include winding the main wound portion 221 on a body region of the cylinder portion 11 at a predetermined angle determined by a diameter of the cylinder portion 11 and a length of the cylinder portion 11 in a central axis direction.

The winding of the twist portion (S22) may include winding the twist portion 222 on a junction portion 13 of the cylinder portion 11 and the dome portion 12 at an angle different from that of the main wound portion 221.

In addition, the winding of the twist portion (S22) may include twisting and winding the twist portion 222 while allowing the twist portion 222 to press the end of the hoop layer 21 when the helical layer 22 passes by the hoop layer 21 and then is wound on the dome portion 12, thereby preventing a void which may occur over the junction portion 13 of the cylinder portion and the dome portion due to an end portion of the hoop layer.

Referring to FIG. 11, the winding of the twist portion (S22) may further include switching the helical layer (S221) and winding the junction portion (S222).

The switching of the helical layer (S221) may include a winding direction of a twist switch portion 2221 is switched based on the central axis of the high-pressure tank in a range in which the helical layer 22 entirely maintains its contact with the dome portion 12 when the helical layer 22 is wound on the dome portion 12.

In addition, the winding of the junction portion (S222) may include positioning the twist switch portion 2221 on the junction portion 13 of the cylinder portion 11 and the dome portion 12.

The scope of the present disclosure is not limited to the descriptions and expressions of the exemplary embodiments explicitly described above. In addition, it is added once again that the scope of the present invention cannot be limited due to obvious changes or substitutions in a technical field to which the present invention pertains.

DESCRIPTION OF SYMBOLS

10: liner
11: cylinder portion
12: dome portion
13: junction portion
20: composite material layer
21: hoop layer
22: helical layer
221: main wound portion
222: twist portion
2221: twist switch portion
30: void
θ: angle of main wound portion

The invention claimed is:

1. A high-pressure tank comprising:
a liner including a cylinder portion and two dome portions respectively formed at both ends of the cylinder portion; and
a composite material layer including a hoop layer and a helical layer formed by a continuous composite material wound on an outer circumferential surface of the liner,
wherein the helical layer includes:
a main wound portion formed by the continuous composite material wound on the cylinder portion, and
a twist portion formed by the continuous composite material wound on a junction portion of the cylinder portion and the dome portions,
wherein the continuous composite material at the twist portion is twisted and wound while wrapping on an end portion of the hoop layer when the continuous composite material passes by the hoop layer and is then wound toward the dome portions,
wherein a winding angle of the continuous composite material with respect to a central axis direction of the cylinder portion is changed when the continuous composite material passes the main wound portion and is wound at the twist portion, and
wherein the winding angle of the continuous composite material is maintained to a constant angle θ at the main wound portion and is changed to be larger from the constant angle θ at the twist portion.

2. The high-pressure tank of claim 1, wherein the angle θ of the main wound portion is defined by Equation 1 below:

$$\theta = \tan^{-1}\left(\frac{\pi D}{2A}\right) \quad \text{[Equation 1]}$$

D: Diameter of cylinder portion
A: Length of cylinder portion in length direction.

3. The high-pressure tank of claim 2, wherein the cylinder portion has the diameter including a thickness of the hoop layer in a state where the hoop layer is wound on the outer circumferential surface of the cylinder portion.

4. The high-pressure tank of claim 1, wherein each of the hoop layer and the helical layer is formed of towpreg.

5. A manufacturing method of a high-pressure tank including a liner which includes a cylinder portion and two dome portions respectively formed at both ends of the cylinder portion, and a composite material layer wound on an outer circumferential surface of the liner, the method comprising:
winding a hoop layer of winding a continuous composite material on an outer circumferential surface of the cylinder portion; and
winding a helical layer of winding the continuous composite material on the hoop layer and an outer circumferential surface of the dome portions,
wherein the winding of the helical layer includes:
a winding a main wound portion of winding the continuous composite material on the cylinder portion, and
winding a twist portion of winding the continuous composite material on a junction portion of the cylinder portion and the dome portions,
in the winding the twist portion, the continuous composite material is twisted and wound while the continuous composite material presses an end of the hoop layer when the continuous composite material passes by the hoop layer and then is wound toward the dome portions,
wherein a winding angle of the continuous composite material with respect to a central axis direction of the cylinder portion is changed when the continuous composite material passes the main wound portion and is wound at the twist portion, and
wherein the winding angle of the continuous composite material is maintained to a constant angle θ at the main wound portion and is changed to be larger from the constant angle θ at the twist portion.

* * * * *